(12) United States Patent
Cook et al.

(10) Patent No.: US 10,902,644 B2
(45) Date of Patent: *Jan. 26, 2021

(54) MEASURES FOR IMAGE TESTING

(71) Applicant: Samsung Display Co., Ltd., Yongin-si (KR)

(72) Inventors: Gregory W. Cook, San Jose, CA (US); Javier Ribera Prat, Lafayette, IN (US); Shiva Moballegh, Campbell, CA (US)

(73) Assignee: Samsung Display Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/941,340

(22) Filed: Jul. 28, 2020

(65) Prior Publication Data

US 2020/0388055 A1 Dec. 10, 2020

Related U.S. Application Data

(63) Continuation of application No. 16/052,545, filed on Aug. 1, 2018, now Pat. No. 10,769,817.
(Continued)

(51) Int. Cl.
*G06K 9/00* (2006.01)
*G06T 7/90* (2017.01)
(Continued)

(52) U.S. Cl.
CPC .............. *G06T 7/90* (2017.01); *G06T 7/0002* (2013.01); *G09G 3/006* (2013.01);
(Continued)

(58) Field of Classification Search
CPC ... G06T 7/90; G06T 2207/30168; G09G 5/02; G09G 2340/02; G09G 2300/0452;
(Continued)

(56) References Cited

U.S. PATENT DOCUMENTS

| 5,664,158 A | 9/1997 | Larimer |
| 6,766,056 B1 | 7/2004 | Huang et al. |

(Continued)

FOREIGN PATENT DOCUMENTS

| CN | 202928783 U | * | 5/2013 | |
| DE | 102008041458 A1 | * | 3/2010 | ............... A61B 3/06 |

(Continued)

OTHER PUBLICATIONS

Martin, Russel et al., "Color matrix display simulation based upon luminance and chromatic contrast sensitivity of early vision," Human Vision, Visual Proceeding, and Digital Display III, SPIE, vol. 1666, 1992, 7 pages, XP008005090.

(Continued)

*Primary Examiner* — Mahendra R Patel
(74) *Attorney, Agent, or Firm* — Lewis Roca Rothgerber Christie LLP

(57) ABSTRACT

A system and method for image testing is configured to apply at least one display property to a test image to generate a display modified test image and applying the at least one display property to a reference image to generate a display modified reference image. The system also applies a human eye model to the display modified test image to generate an eye modified test image and applies the human eye model to the display modified reference image to generate an eye modified reference image. The system may compare the eye modified test image with the eye modified reference image to determine human perceivable differences between the test image and the reference image.

20 Claims, 12 Drawing Sheets

Related U.S. Application Data

(60) Provisional application No. 62/542,245, filed on Aug. 7, 2017.

(51) Int. Cl.

| | | |
|---|---|---|
| *H04N 1/60* | (2006.01) | |
| *G09G 3/00* | (2006.01) | |
| *G06T 7/00* | (2017.01) | |
| *H04N 17/04* | (2006.01) | |
| *G09G 5/02* | (2006.01) | |

(52) U.S. Cl.
CPC ......... *H04N 1/6011* (2013.01); *H04N 1/6088* (2013.01); *H04N 17/045* (2013.01); *G06T 2207/30168* (2013.01); *G09G 5/02* (2013.01); *G09G 2300/0452* (2013.01); *G09G 2340/02* (2013.01); *G09G 2380/08* (2013.01)

(58) Field of Classification Search
CPC ............. G09G 2380/08; H04N 1/6088; H04N 1/6011; H04N 17/045; G06G 7/48; G16H 50/50
USPC .......................................................... 382/162
See application file for complete search history.

(56) References Cited

U.S. PATENT DOCUMENTS

| | | | | |
|---|---|---|---|---|
| 6,791,716 | B1* | 9/2004 | Buhr | H04N 1/6075 358/1.9 |
| 8,031,938 | B2 | 10/2011 | Edge | |
| 8,243,326 | B2 | 8/2012 | Olson | |
| 9,164,874 | B1* | 10/2015 | Tomay | G06F 11/3672 |
| 9,256,803 | B2 | 2/2016 | Price et al. | |
| 2001/0053247 | A1* | 12/2001 | Sowinski | H04N 1/00169 382/162 |
| 2005/0259869 | A1* | 11/2005 | Lohweg | G01J 3/462 382/162 |
| 2006/0167670 | A1* | 7/2006 | Deering | G16H 50/50 703/11 |
| 2006/0251320 | A1* | 11/2006 | Diederichs | G07D 7/12 382/165 |
| 2008/0117231 | A1 | 5/2008 | Kimpe | |
| 2009/0225226 | A1 | 9/2009 | Kakuta | |
| 2009/0323123 | A1* | 12/2009 | Walton | H04N 1/40 358/3.23 |
| 2010/0057368 | A1* | 3/2010 | Afeyan | A61K 49/0004 702/19 |
| 2010/0091200 | A1* | 4/2010 | Vigouroux | H04N 9/3155 348/756 |
| 2010/0135591 | A1* | 6/2010 | Zador | H04N 5/349 382/255 |
| 2010/0149344 | A1* | 6/2010 | Ferguson | H04N 9/73 348/180 |
| 2011/0148902 | A1* | 6/2011 | Haga | H04N 17/02 345/589 |
| 2011/0243435 | A1 | 10/2011 | Lee et al. | |
| 2012/0069551 | A1* | 3/2012 | Bues | G09G 3/2003 362/97.2 |
| 2012/0082374 | A1* | 4/2012 | Agarwal | H04N 1/6088 382/162 |
| 2013/0033528 | A1 | 2/2013 | Sarkar et al. | |
| 2013/0250322 | A1* | 9/2013 | Kawabata | H04N 1/6055 358/1.9 |
| 2013/0258386 | A1* | 10/2013 | Wagner | H04N 1/00 358/1.14 |
| 2014/0168250 | A1 | 6/2014 | Stauder et al. | |
| 2014/0254897 | A1* | 9/2014 | Ferguson | G06T 7/001 382/128 |
| 2014/0363093 | A1* | 12/2014 | Miller | H04N 19/40 382/235 |
| 2015/0221280 | A1* | 8/2015 | Van Der Vleuten | G06T 5/002 382/167 |
| 2017/0034519 | A1* | 2/2017 | Rosewarne | H04N 19/85 |
| 2017/0062005 | A1 | 3/2017 | Kolesnikov et al. | |
| 2017/0180759 | A1* | 6/2017 | Mertens | H04N 19/16 |
| 2017/0205977 | A1* | 7/2017 | Fertik | G06F 3/04842 |
| 2017/0289555 | A1 | 10/2017 | Su | |
| 2018/0234704 | A1 | 8/2018 | Atkins et al. | |
| 2018/0261184 | A1 | 9/2018 | Ninan | |
| 2019/0027082 | A1* | 1/2019 | Van Belle | G09G 3/20 |
| 2019/0098317 | A1 | 3/2019 | Lu et al. | |
| 2019/0124367 | A1 | 4/2019 | Lu et al. | |

FOREIGN PATENT DOCUMENTS

| | | | | |
|---|---|---|---|---|
| KR | 20010026118 A | * | 4/2001 | |
| WO | WO-2006049352 A1 | * | 5/2006 | ............. G09G 3/006 |

OTHER PUBLICATIONS

EPO Office Action dated Feb. 26, 2020, for corresponding European Patent Application No. 18187870.3 (6 pages).

EPO Extended Search Report dated Oct. 10, 2018, for corresponding European Patent Application No. 18187870.3 (8 pages).

* cited by examiner

Cone mosaic in the retina

MEASURES FOR IMAGE TESTING

CROSS-REFERENCE TO RELATED APPLICATION(S)

This application is a continuation of and claims priority to and the benefit of U.S. patent application Ser. No. 16/052,545, filed Aug. 1, 2018, which claims priority to and the benefit of U.S. Provisional Patent Application Ser. No. 62/542,245, filed Aug. 7, 2017 and entitled "MEASURES FOR VISUALLY LOSSLESS TESTING," the entire content of each of which is hereby expressly incorporated by reference.

FIELD

One or more aspects of embodiments according to the present disclosure relate to displays, and more particularly to a system and method for testing the operation of a display and the quality of an image being displayed.

BACKGROUND

Electronic devices such as cellular phones, wearable devices, tablet computers, laptops, monitors, and televisions all utilize displays in various forms and formats. Displays are generally composed of patterned arrays of pixels configured to emit light in various colors. These pixels are generally composed of organic light emitting diodes (OLEDs), liquid crystals used in combination with a backlight (e.g., LCDs), micro light emitting diodes (microLEDs), etc. Each pixel generally includes multiple subpixels that are each configured to emit specific wavelengths of light. For example, subpixels typically include red, blue, and green subpixels. These subpixels and pixels may be arranged and driven in a number of ways, with the goal of accurately reproducing an image to the human visual system. A common configuration of pixels is a RGB stripe configuration which has red, blue, and green subpixels in every pixel. In some cases, the subpixels may be subsampled, for example, an RGBG display has a green subpixel for each pixel, but only one red and one blue subpixel for two pixels.

For a variety of reasons, various compression techniques may be applied to an image that is transmitted to the display. In some cases, the compression technique utilized may result in what is termed as a "visually lossless" image being displayed by the display meaning that a typical person would not perceive any artifacts introduced by the compression technique. Some techniques, however, result in perceivable artifacts being noticeable to a user observing a display. The artifacts may include incorrect colors, blur, flickering, aliasing, blockiness, etc.

Both the display itself and any compression used may therefore introduce artifacts into an image being displayed. A number of systems have been created to test both displays and the images being provided to the displays for visual artifacts. For example, subjective test scoring using the ISO/IEC 29170-2:2017 standard procedure using human test subjects and a calibrated monitor is considered to be a highly effective way to evaluate the coding of image sequences. These subjective tests often involve a person viewing tens or hundreds of images and providing an evaluation for each one. Conducting these tests can be time consuming for both the test subjects and the test administrators. Thus, objective testing systems have been utilized to assist in evaluation.

Common objective testing systems utilize a variety of metrics to attempt to quantify visual quality, but they have not proven to be as effective as subjective test scoring. Thus common objective testing systems that use peak signal to noise ratios (PSNRs) and pattern-color sensitivity are typically used for performing preliminary testing before utilizing human test subjects. One of the issues with the objective measures is that they do not incorporate display spatial characteristics (e.g. subpixel configuration) or human perception characteristics. Thus, an improved objective testing system that takes into account display and human characteristics is needed.

The above information is only for enhancement of understanding of the background of embodiments of the present disclosure, and therefore may contain information that does not form the prior art

SUMMARY

Some embodiments of the present disclosure provide a system and method for image testing allowing a user to compare images to determine the perceivable differences. The system and method applies at least one display property to a test image to generate a display modified test image and applies the at least one display property to a reference image to generate a display modified reference image. A human eye model is applied to the display modified test image to generate an eye modified test image and the human eye model is applied to the display modified reference image to generate an eye modified reference image. The eye modified test image may then be compared with the eye modified reference image to determine human perceivable differences between the test image and the reference image.

In various embodiments, the at least one display property includes at least one of a subpixel layout or a spectral emission.

In various embodiments, applying at least one display property to the test image to generate the display modified test image includes: generating a subpixel matrix for a display based on the subpixel layout; applying the subpixel matrix to the test image; converting the test image to the spectral domain from 3-color space; and applying the spectral emission to the test image to generate the display modified test image.

In various embodiments, applying at least one display property to the reference image to generate the display modified reference image includes: applying the subpixel matrix to the reference image; converting the reference image to the spectral domain from 3-color space; and applying the spectral emission to the reference image to generate the display modified test image.

In various embodiments, applying human eye model to the display modified test image to generate an eye modified test image comprises applying an optical transfer function to the display modified test image; and applying human eye model to the display modified reference image to generate an eye modified reference image comprises applying the optical transfer function to the display modified reference image.

In various embodiments, the system and method further include: converting the eye modified test image from the spectral domain to 3-color space; converting the eye modified reference image from the spectral domain to 3-color space; applying a cone absorption mosaic to the eye modified test image for a plurality of eye positions to generate a plurality of cone absorption test images; applying a cone absorption mosaic to the eye modified reference image for the plurality of eye positions to generate a plurality of cone absorption reference images; averaging the plurality of cone absorption test images to generate the eye modified test image; and averaging the plurality of cone absorption reference images to generate the eye modified reference image.

In various embodiments, comparing the eye modified test image with the eye modified reference image includes: transforming the eye modified reference image and eye modified test image into CIELAB color space; calculating the Euclidean distance between each pixel in the eye modified reference image and the corresponding pixel in the eye modified reference image; and applying a pooling function to the Euclidean distances.

In various embodiments, the pooling function includes at least one of applying a mean to the Euclidean distances or selecting a value according to a percentile rank.

In various embodiments, the test image may include an image resulting from a lossy compression algorithm being applied to the reference image.

In various embodiments, an image testing system for comparing human perceivable differences between two images, includes: a processor and a memory storing instructions causing the processor to: apply, using a display model module, at least one display property to a test image to generate a display modified test image; apply, using the display model module, the at least one display property to a reference image to generate a display modified reference image; apply, using an eye model module, a human eye model to the display modified test image to generate an eye modified test image; apply, using the eye model module, a human eye model to the display modified reference image to generate an eye modified reference image; and compare, using a comparison module, the eye modified test image with the eye modified reference image to determine human perceivable differences between the test image and the reference image.

In various embodiments, the at least one display property includes at least one of a subpixel layout or a spectral emission.

In various embodiments, the display module is configured to: generate a subpixel matrix for a display based on the subpixel layout; apply the subpixel matrix to the test image; convert the test image to the spectral domain from 3-color space; and apply the spectral emission to the test image to generate the display modified test image.

In various embodiments, the display module is further configured to: apply the subpixel matrix to the reference image; convert the reference image to the spectral domain from 3-color space; and apply the spectral emission to the reference image to generate the display modified test image.

In various embodiments, the eye model module is configured to: apply an optical transfer function to the display modified test image; and apply the optical transfer function to the display modified reference image.

In various embodiments, the eye model module is further configured to: convert the eye modified test image from the spectral domain to 3-color space; convert the eye modified reference image from the spectral domain to 3-color space; apply a cone absorption mosaic to the eye modified test image for a plurality of eye positions to generate a plurality of cone absorption test images; apply a cone absorption mosaic to the eye modified reference image for the plurality of eye positions to generate a plurality of cone absorption reference images; average the plurality of cone absorption test images to generate the eye modified test image; and average the plurality of cone absorption reference images to generate the eye modified reference image.

In various embodiments, the comparison module is configured to: transform the eye modified reference image and eye modified test image into CIELAB color space; calculate the Euclidean distance between each pixel in the eye modified reference image and the corresponding pixel in the eye modified reference image; and applying a pooling function to the Euclidean distances.

In various embodiments, the pooling function includes at least one of applying a mean to the Euclidean distances or selecting a value according to a percentile rank.

In various embodiments, the test image includes an image resulting from a lossy compression algorithm being applied to the reference image.

In various embodiments, a method for comparing images for image testing includes: applying a display model to an input image to generate a display modified input image, wherein the applying the display model includes: generating a subpixel matrix for a display based on a subpixel layout; applying the subpixel matrix to an input image; converting the input image to the spectral domain from 3-color space; applying a spectral emission to the input image to generate the display modified input image; applying an optical transfer function to the display modified input image to generate a retinal modified input image; and comparing the retinal modified input image with a reference image to determine human perceivable differences between the input image and the reference image.

In various embodiments, comparing the retinal modified input image with the reference image includes: transforming the eye modified input image and reference image into CIELAB color space; and calculating the difference between each pixel in the eye modified input image and the corresponding pixel in the reference image.

BRIEF DESCRIPTION OF THE DRAWINGS

Some embodiments can be understood in more detail from the following description taken in conjunction with the accompanying drawings, in which.

DETAILED DESCRIPTION

Figure 1:
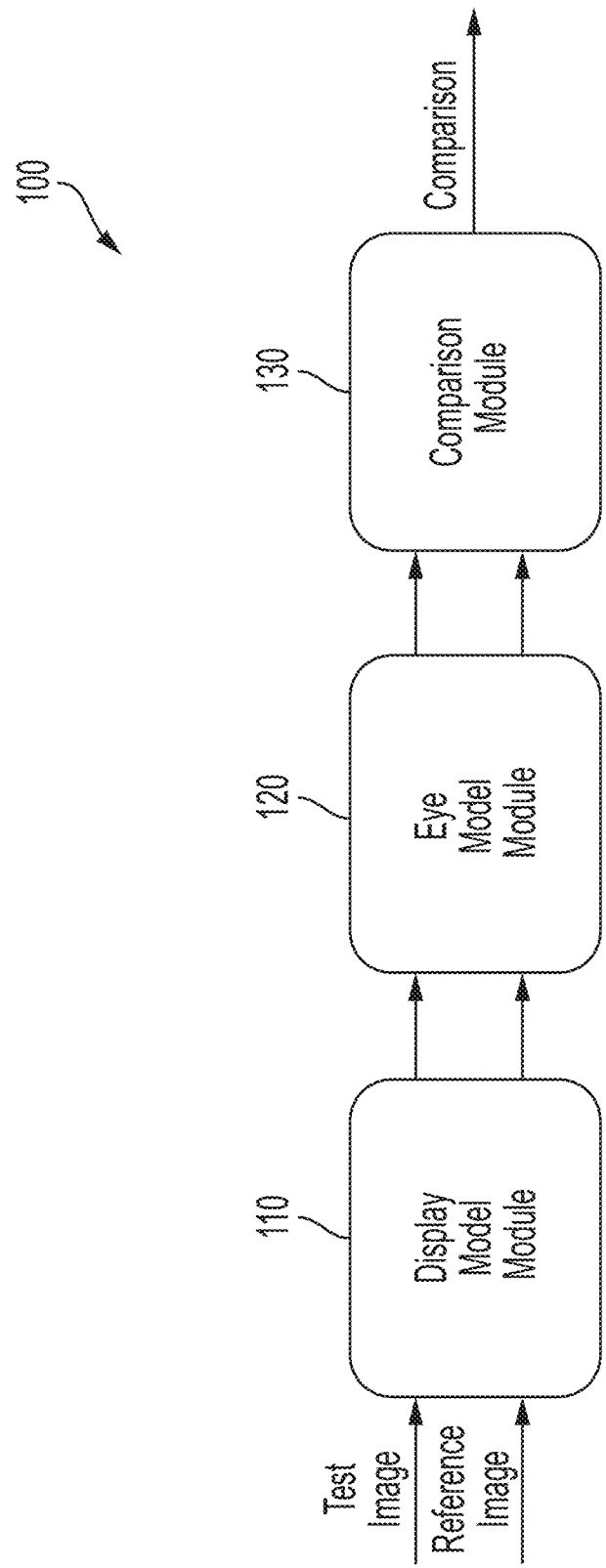
FIG. 1 depicts a system for image testing according to various embodiments.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

Embodiments of the present disclosure include a system and method for image testing. The system allows for the objective evaluation of image quality being displayed on a given display system. The system allows for the inclusion of information about the display that will be displaying the image such as subpixel arrangement and spectral emission. The system also incorporates the physics of the human eye. A reference and a test image may be supplied to the system which in turns modifies the images according to the display and eye information. The modified images may then be compared to determine the human perceivable visual quality of the test image.

Lossless compression algorithms by definition allow for data to be compressed and perfectly reconstructed into its original form. Lossy compression algorithms are generally capable of further reducing the size of data (e.g., an image or video) at the expense of losing some of the original data. In the field of image and video, a compression algorithm is said to be "visually lossless" when the differences between the original image and the compressed image are imperceptible to a human when displayed on a display. Being able to predict when a compression algorithm will result in a "visually lossless" picture is important for determining the compression parameters.

As discussed above, current methods of evaluating image quality use either subjective testing (e.g., with human evaluations) or objective calculations. Subjective tests include human test subjects reviewing large numbers of images and may include substantial analysis by the test administrator. Conventional objective tests are capable of measuring difference between two images, however, they lack the ability to incorporate how a human would perceive those differences on a real world display. Thus, these conventional methods are either too time consuming (e.g., with subjective testing) or are generally ineffective (e.g., with objective testing). In various embodiments, the present system improves on the previous systems by incorporating display data and human physiological data into the objective evaluation. For example, prior objective systems relied upon the differences between two images.

Embodiments of the present system improve on the deficiencies of past systems by providing an increased accuracy objective testing system. In various embodiments, the testing system employs a computational observer (e.g., a computational human observer) to process the images to find the perceivable differences. For example, in various embodiments, the system is configured to transform the image being tested to account for the specific display being used to show the image. For example, many displays may not exactly reproduce the source image due to their configuration and characteristics. Furthermore, the system may then take into account the perceptional abilities of the human eye. Thus, when the modified images are compared, the comparison shows an estimate of what an actual human would perceive differently when viewing the images on the display. Embodiments of the present disclosure provide for a specific combination of techniques that provide the speed and ease of use of an objective testing system with the accuracy of subjective testing (e.g., an improved correlation).

In various embodiments, the present system provides high levels of versatility to the user. For example, the system may be used with any display and images of any size. Furthermore, a user may apply various human physiological models according to their preferences and current research. The system for image testing utilizes physics-based models, and therefore can be easily modified based on application. Thus, the system employees a set of physics and physiological-based rules to provide improvements on prior systems and methods.

Figure 2:
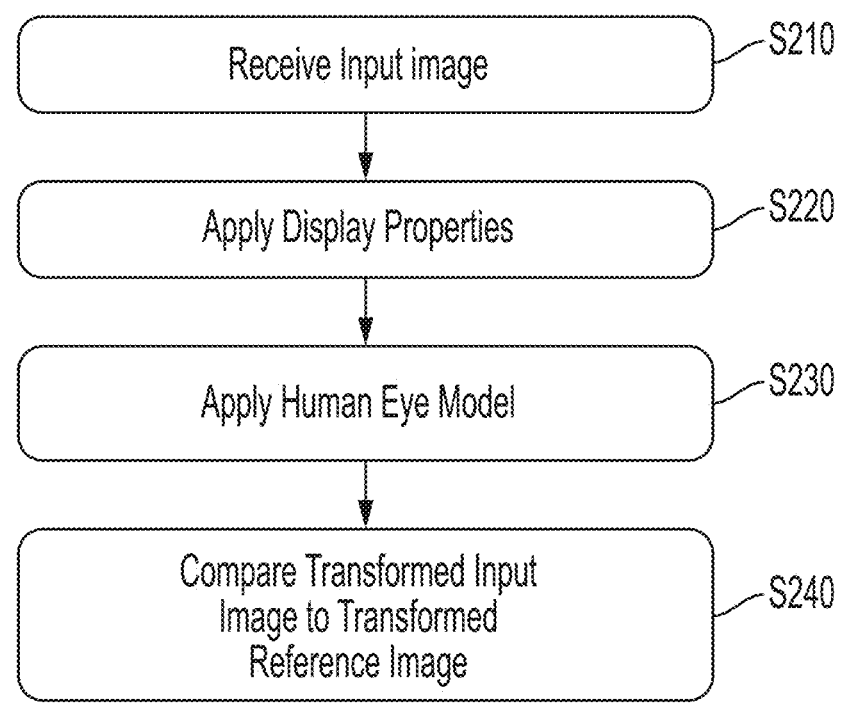
FIG. 2 depicts a method of image testing according to various embodiments.

FIG. 1 depicts a system for image testing according to various embodiments. FIG. 2 depicts a method of image testing according to various embodiments.

Referring to FIGS. 1 and 2, in various embodiments, an image testing system 100 and method 200 may be configured to receive a test image and a reference image, process the images using display and eye characteristics, and compare the processed images to determine the human perceivable differences. The image testing system 100 may operate on a computing device, such as a server, workstation, laptop, or other computing device and work in conjunction with various input sources such as measurement devices for assessing display attributes.

In various embodiments, the testing system 100 includes a display model module 110, an eye model module 120, and a comparison module 130. In various embodiments, the test image includes any image that is a modified version of the reference image. For example, the test image may include an image that results from the use of a lossy compression algorithm used on the reference image. In other embodiments, the test image may be an image of the reference image being shown on a display (e.g., to compare the differences between displays).

In various embodiments, the display model module receives the test image and the reference image (S210). In various embodiments, the display model module 110 is configured to apply the physical properties of a display to each of the reference image and the test image (e.g., to modify the image as if it were being displayed by the display). For example, a given display may have a particular subpixel arrangement and a spectral emission.

Figure 3:
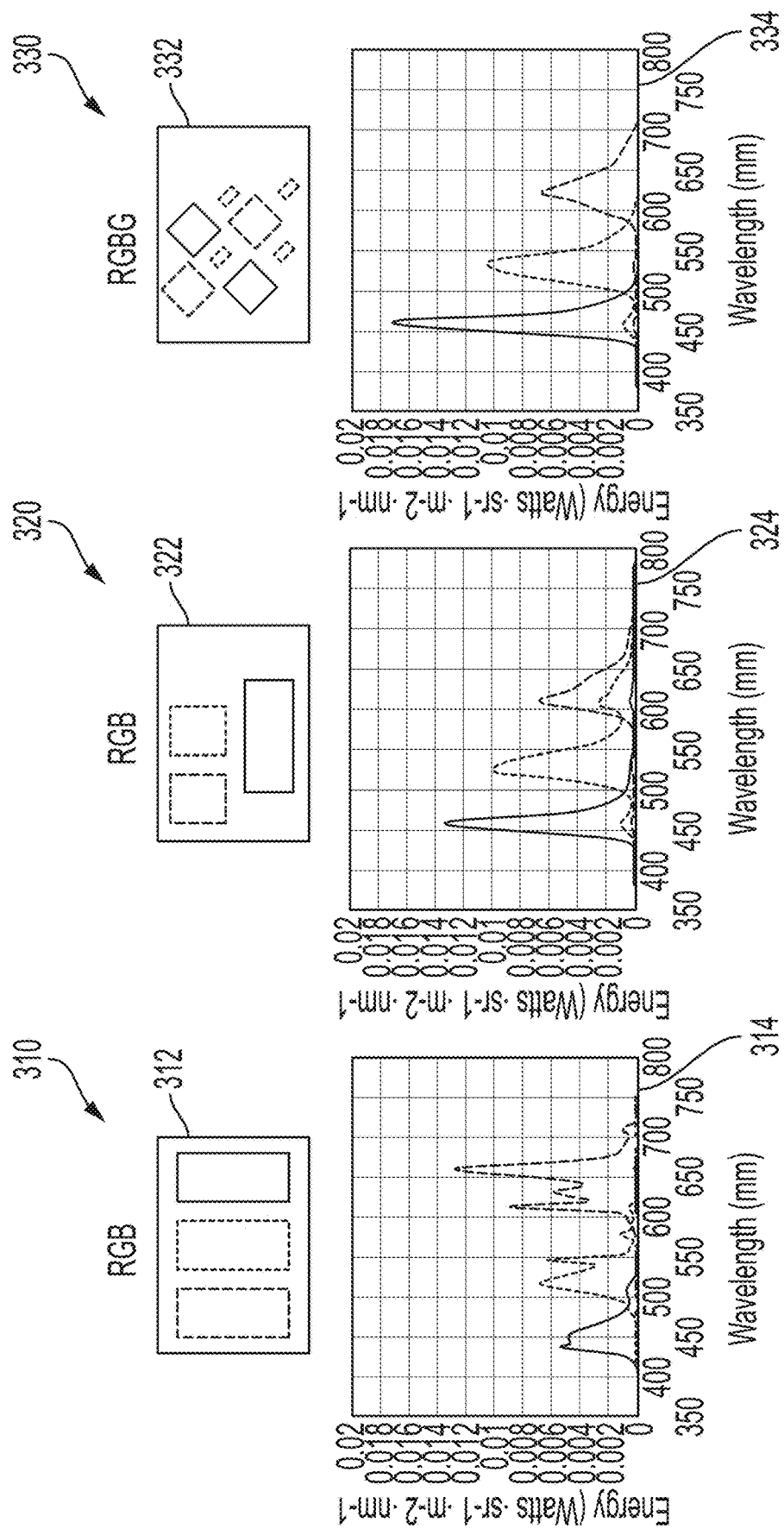
FIG. 3 depicts various display subpixel and spectral emissions according to various embodiments.

FIG. 3 depicts various display subpixel and spectral emissions according to various embodiments.

Referring to FIG. 3 and with continued reference to FIGS. 1 and 2, a display may have a variety of subpixel compositions. For example, a display may have an RGB, RGBY, RGBW, RGBG, or other subpixel configuration. Furthermore, the subpixels may have various pixel geometries. For example, an RGB display may have an RGB stripe arrangement, a triangular pattern arrangement, a diagonal pattern arrangement, a diamond arrangement, or other pixel arrangement (e.g., the second subpixel arrangement 322). Similarly, RGBG, GRBY, and GRBW displays may have a variety of subpixel arrangements as well. In the depicted example, a first display 310 has a first RGB subpixel arrangement 312, a second display 320 has a second RGB subpixel arrangement 322, and a third display 330 has an RGBG subpixel arrangement 332. In various embodiments, the subpixel arrangement of a display may be known, while in other embodiments, the subpixel arrangement may be determined by measuring using an infrared scanner or microscope. Once the arrangement has been determined, a user provides the subpixel arrangement (e.g., subpixel layout) to the display model module 110.

In various embodiments, the display model module 110 also incorporates the spectral emission of a display. The spectral emission of the display, may, for example, be known or may be physically measured using a spectral radiometer. For example, the first display 310 may have a first spectral emission 314, the second display 320 may have a second spectral emission 324, and the third display may have a third spectral emission 334. Once the spectral emission of the display is known, the user may provide the spectral emission to the display model module 110. The spectral emission of the display and the subpixel arrangement may then be used by the display model module 110 to modify an input image (e.g., the reference image and the test image) with the display properties and provide a display modified image to the eye model module (S220). Thus, the reference and test images may be modified based on an actual display that the images could be shown on.

In various embodiments, the eye model module 120 is configured to receive display module modified input images (e.g., the reference image and the test image) and apply a human eye model to the images (S230). In various embodiments, the human eye model may include an optical transfer function modeled on the perception of a human.

Figure 4:
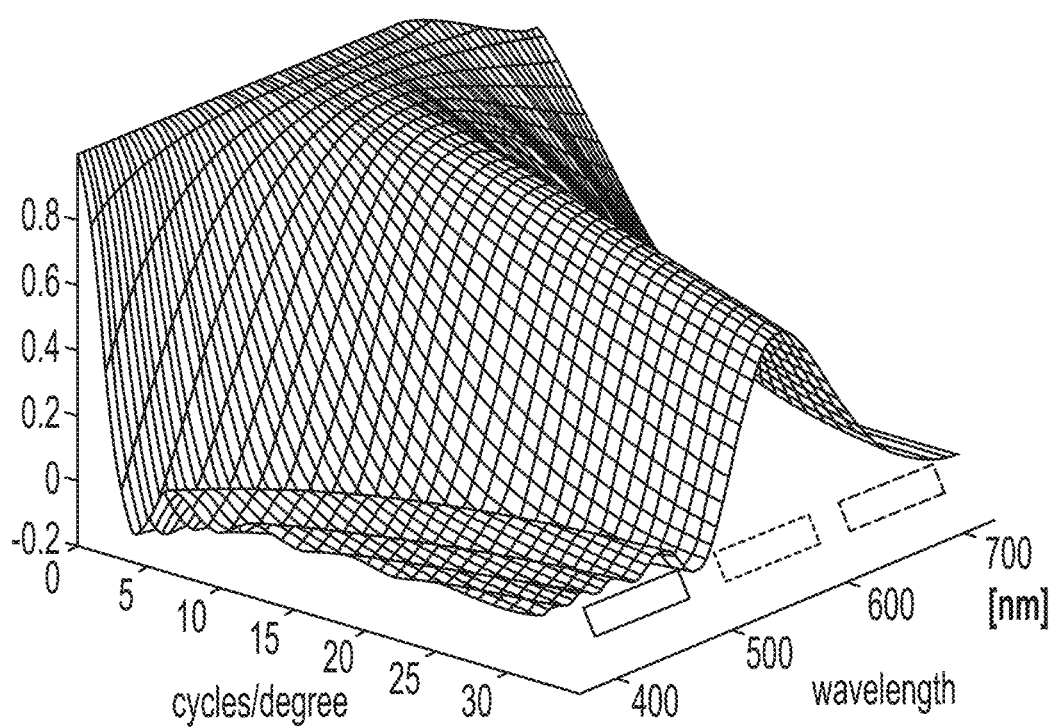
FIG. 4 depicts an example optical transfer function of a human eye according to various embodiments.

FIG. 4 depicts an example optical transfer function of a human eye according to various embodiments.

Referring to FIG. 4 and with continued reference to FIGS. 1 and 2, in various embodiments, the eye model module 120 may be configured to apply human eye characteristics to each input image (e.g., the test image and the reference image). In various embodiments, the eye model module 120 is configured to apply an optical transfer function to each input image. In various embodiments, the optical transfer function may be based on wavelength sensitivity and the complexity of the image measured by the spatial number of cycles per degree on the retina. As shown in FIG. 4, human vision is generally more sensitive to green wavelengths than to blue and red wavelengths when viewing a complex image with a high number of cycles per degree. For example, a smoothly varying gradient (less than one cycle per degree spatial change) will pass the full visible spectrum. However, a complex image with noisy patterns, e.g. over 25 cycles per degree, will not strongly react in the red and blue portions of the visible spectrum. Thus, if the subpixel arrangement and viewing distance are known, the user's sensitivity to any given subpixel may be calculated using the optical transfer function. In various embodiments, the eye model module 120 applies the optical transfer function to the display modified test image and reference image to generate display and eye modified reference and test images.

In various embodiments, the display and eye modified reference and test images are received by the comparison module 130. The comparison module 130 may then determine the differences between the transformed reference and test images (S240). For example, in various embodiments the comparison module 130 may transform the reference and test images into CIELAB color space (e.g., CIE L*a*b*). The transformed images may then be differenced and an output showing the perceivable differences may be generated. Thus, the user may objectively evaluate the quality of the test image.

Figure 5:
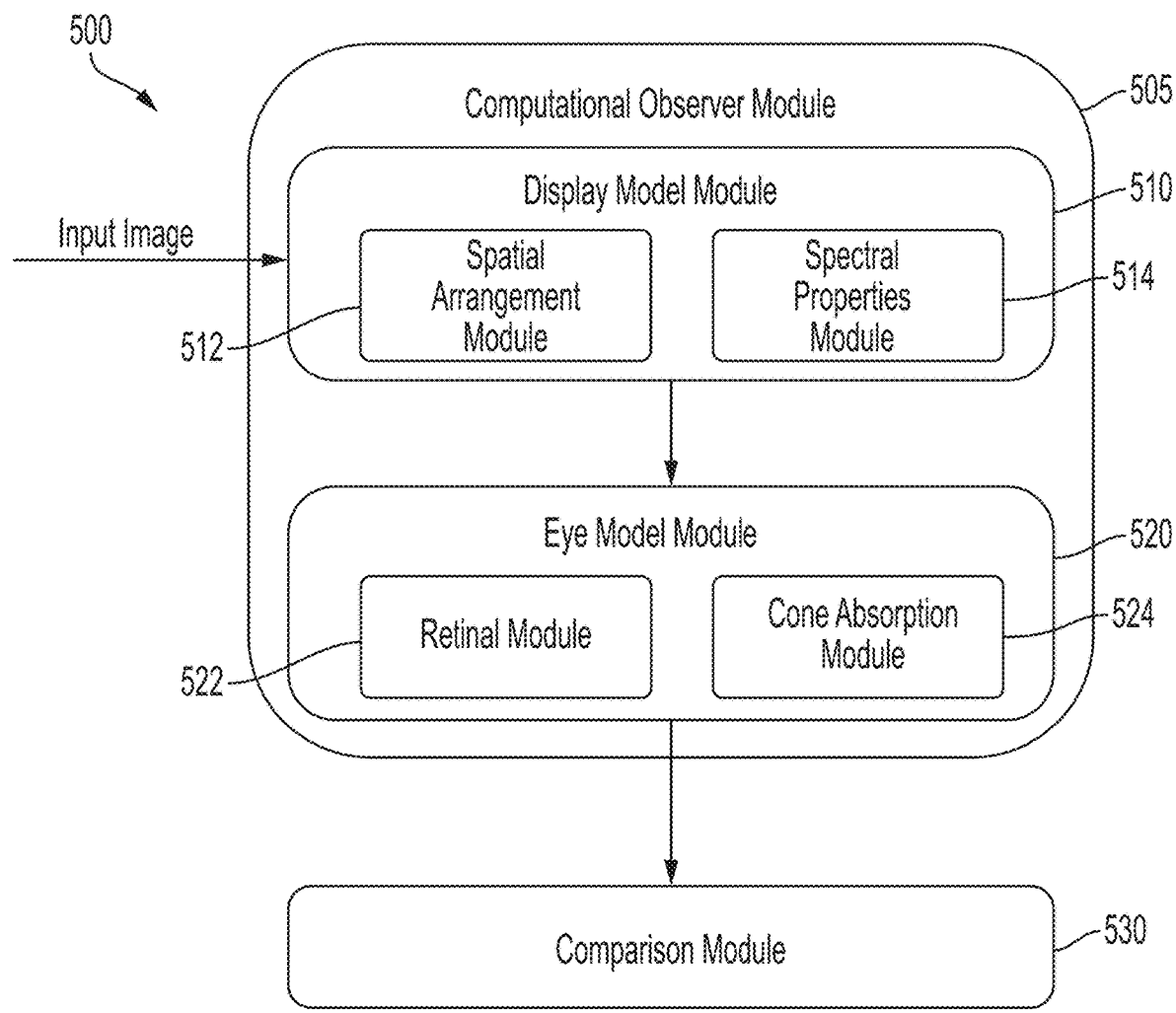
FIG. 5 depicts an embodiment of the testing system according to various embodiments.
Figure 6:
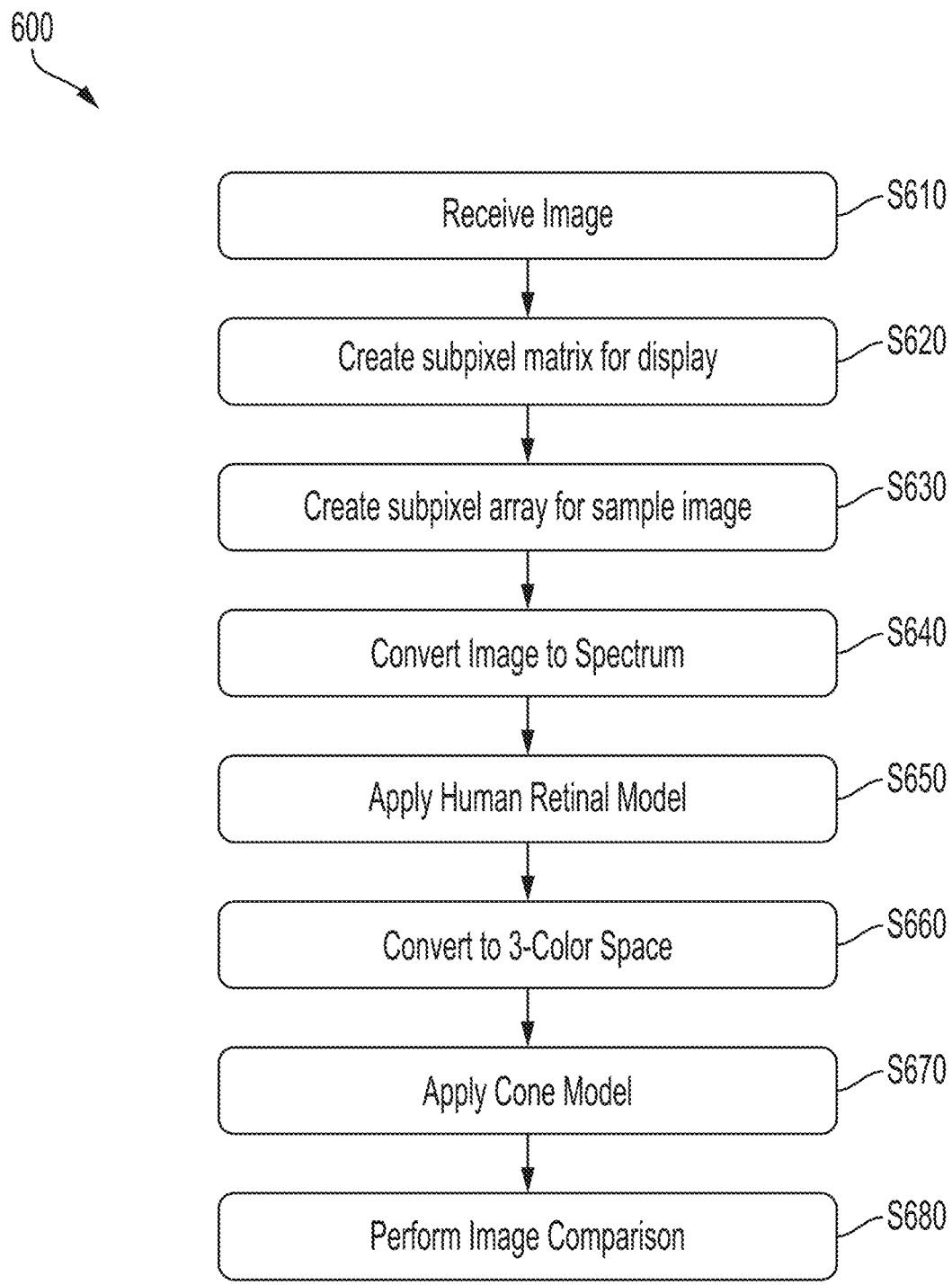
FIG. 6 depicts an embodiment of a method of testing an image according to various embodiments.

FIG. 5 depicts an embodiment of the testing system according to various embodiments. FIG. 6 depicts an embodiment of a method of testing an image according to various embodiments.

Referring to FIGS. 5 and 6, in various embodiments, the testing system 500 and method 600 may be configured to operate using spectral and three color (e.g., RGB) domains. For example, in various embodiments, an input image may include 3 color data and a display may be configured to receive the 3 color data and reproduce the input image according to a spectrum. A human observer, likewise may process the image according to the spectral emission.

In various embodiments, a computational observer 505 may be configured to receive an input image (S610) and process it based on the display and human physiology. For example, the computational observer 505 may be configured to receive an RGB image (e.g., 3-color space image), apply a display's properties to the image to convert it to a spectral image, apply human physiological properties to the image, and convert the image back to RGB for further processing. In various embodiments, the computational observer 505 may utilize Image System Engineering Toolbox for BIOlogy (ISETBIO) for performing operations. In various embodiments, the computational observer 505 includes a display model module 510 and an eye model module 520.

In various embodiments, the display model module 510 receives the input image and a display subpixel arrangement. The display model module 512 includes a spatial arrangement module for modeling the displays subpixel layout and a spectral properties module 514 for modeling the displays spectral emission. Using the subpixel arrangement, the spatial arrangement module 512 may create a virtual subpixel matrix for the display (S620). The image may then be applied to the virtual subpixel matrix to simulate the subpixel array displaying the input image (S630). In various embodiments, the spectral properties module 514 may receive the simulated subpixel array and convert the image from an RGB image to a spectrum image according to the spectral properties of the display (S640). For example, as described above, a user may measure the actual spectral properties of the display and supply the spectral properties to the spectral properties module 514. In various embodiments, the display modified spectral image may be supplied to the eye model module 520 which applies a human retinal model (S650).

In various embodiments, the eye model module 520 may include a retinal model module 522 for simulating the retinal response to the supplied image and a cone absorption module 524 for simulating the absorption of image on simulated cones. In various embodiments, the retinal model module 522 is configured to apply an optical transfer function to the supplied spectral image (e.g., as discussed above). In various embodiments, the retinal modified image may be converted back to 3-color space from the spectral space (S660). In various embodiments, cone absorption module 524 is configured to simulate the absorption of various colors based on sample arrangements of an eye's cones. The cone absorption module 524 applies cone absorption to the image (S670). The processed image may then be passed from the computational observer module 505 to the comparison module 530 which performs a comparison between the test image and the reference image (S680).

In various embodiments, describing a single pixel in the spectral domain may include 31 values (e.g., 31 8-bit values) instead of the 3 values (e.g., 3 8-bit or 10-bit values) used in the RGB domain. An input image may for example include a relatively high resolution. For example, an input image may include a FullHD resolution (1920×1080 pixels), a 4k resolution (3840×2160 pixels), an 8k resolution (7680×4320 pixels), or any other resolution. Thus, converting an image from 3-color space to a spectral image may result in a relatively large size (e.g. a 10× increase in size). In various embodiments, the testing system 500 may be configured to split an input image supplied to the system into a plurality of portions and the test system 500 and method 600 may run multiple times until each full image has been processed. In various embodiments, the each portion of each image may be processed and the comparison module 530 may receive the complete processed test and reference images for comparison. In other embodiments, corresponding portions of the test and reference images may be processed either consecutively or concurrently and the comparison module may compare each corresponding portion.

Figure 7:
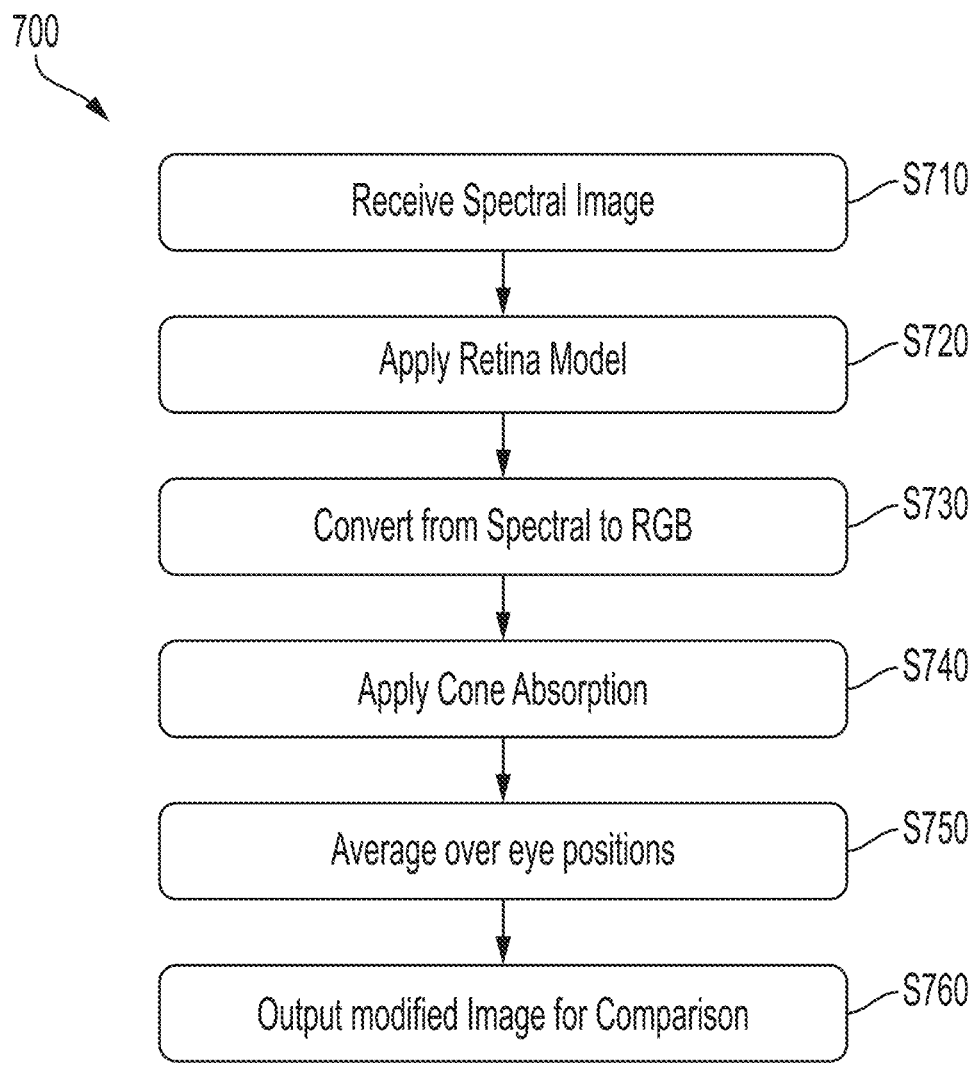
FIG. 7 depicts an example method of processing an image by an eye model module according to various embodiments.
Figure 8:
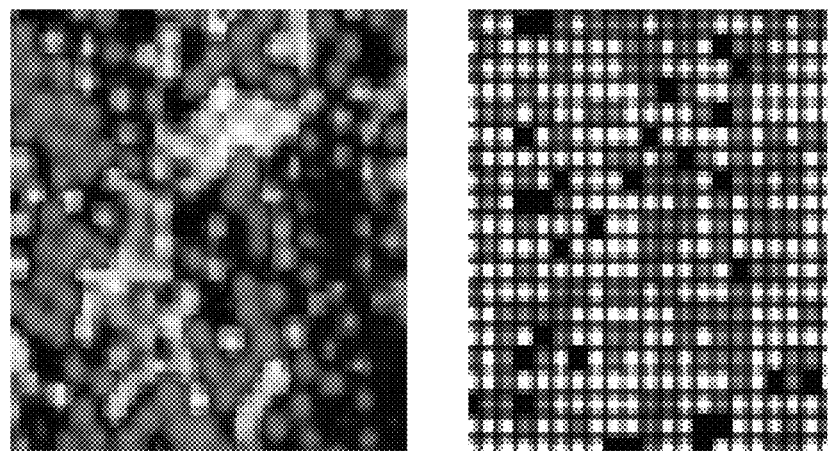
FIG. 8 depicts example cone mosaics used by the eye model module according to various embodiments.

FIG. 7 depicts an example method of processing an image by an eye model module according to various embodiments. FIG. 8 depicts example cone mosaics used by the eye model module according to various embodiments.

Referring to FIGS. 7 and 8, in various embodiments, the testing system is configured to apply an eye model that uses both retinal and cone absorption. In various embodiments, a spectral image is received for applying human eye model processing (S710) (e.g., received at an eye model module as described above). In various embodiments, a retinal model may be applied to the received image (S720). For example, as described above, an optical transfer function may be applied to the spectral image. In various embodiments, the image may then be converted from a spectral image to an RGB image (e.g., a 3-color image) (S730). A cone absorption mosaic may then be applied to the RGB image (S740).

FIG. 8 depicts two examples of cone mosaics. On the left is an actual cone mosaic and on the right is a sampled representation. For example, human eyes have 3 types of cones, each being configured to absorb different spectra of light. For example, short cones perceive blue light, medium cones perceive green light, and long cones perceive red light. The cone mosaics provide a simulation of the positioning of the cones in the retina.

In various embodiments, the cone mosaics may be applied for a plurality of eye positions (e.g., for twenty eye positions). For example, a person's eyes may make a variety of movements due to tremors, drift, and microsaccades. Each of the resulting images may then be averaged (S750) and the resulting image may be output (S760).

Figure 9:
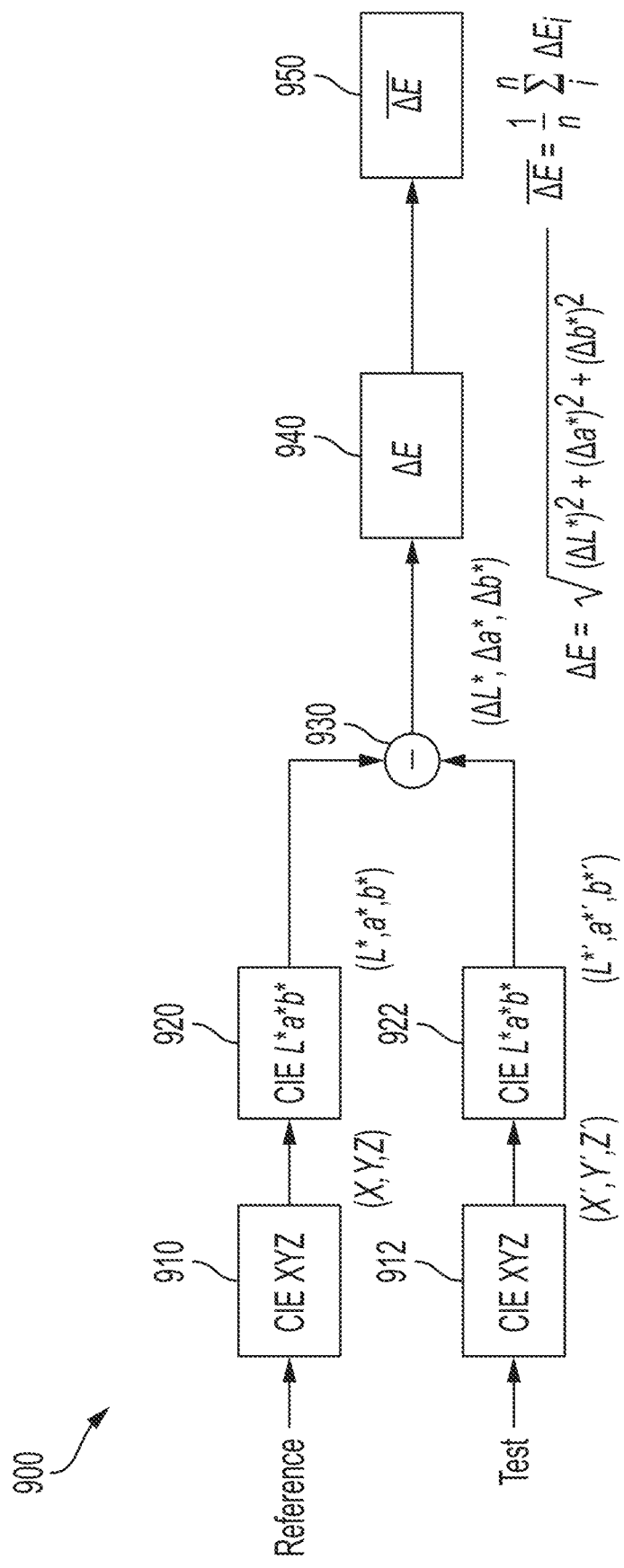
FIG. 9 depicts an example image comparison method according to various embodiments.

FIG. 9 depicts an example image comparison method according to various embodiments.

Referring to FIG. 9, in various embodiments, the difference between the reference and test images may be calculated. For example, a machine learning classifier may be used to classify whether the differences between the images are perceivable. In other embodiments, the system may provide an output with numerical differences between the two images. For example, the processed reference and test images may be received and processed in CIELAB color space. In some embodiments, S-CIELAB may be utilized to compare the processed test and reference images. For example, a 3-color reference image and a 3-color test image may be received at CIE XYZ 910, 912 and converted from an "X, Y, Z" color space to "L*, a*, b*" color space at CIE L*a*b* 920, 922. Once in CIELAB color space the differences between the L*, a*, b* components at each pixel for the two images may be calculated 930. The Euclidean distance may then be calculated (e.g. the square root of the sum of the squares of the differences for each component) 940. A pooling function 950 may then be used to provide a single output representing the differences between the two images. For example, in various embodiments, the pooling function may include an average of the difference (e.g., Euclidean distances) across every pixel (e.g., the mean delta E ($\overline{\Delta E}$)). In other embodiments, the pooling function may use percentile (e.g., the median or 99th percentile).

Figure 10:
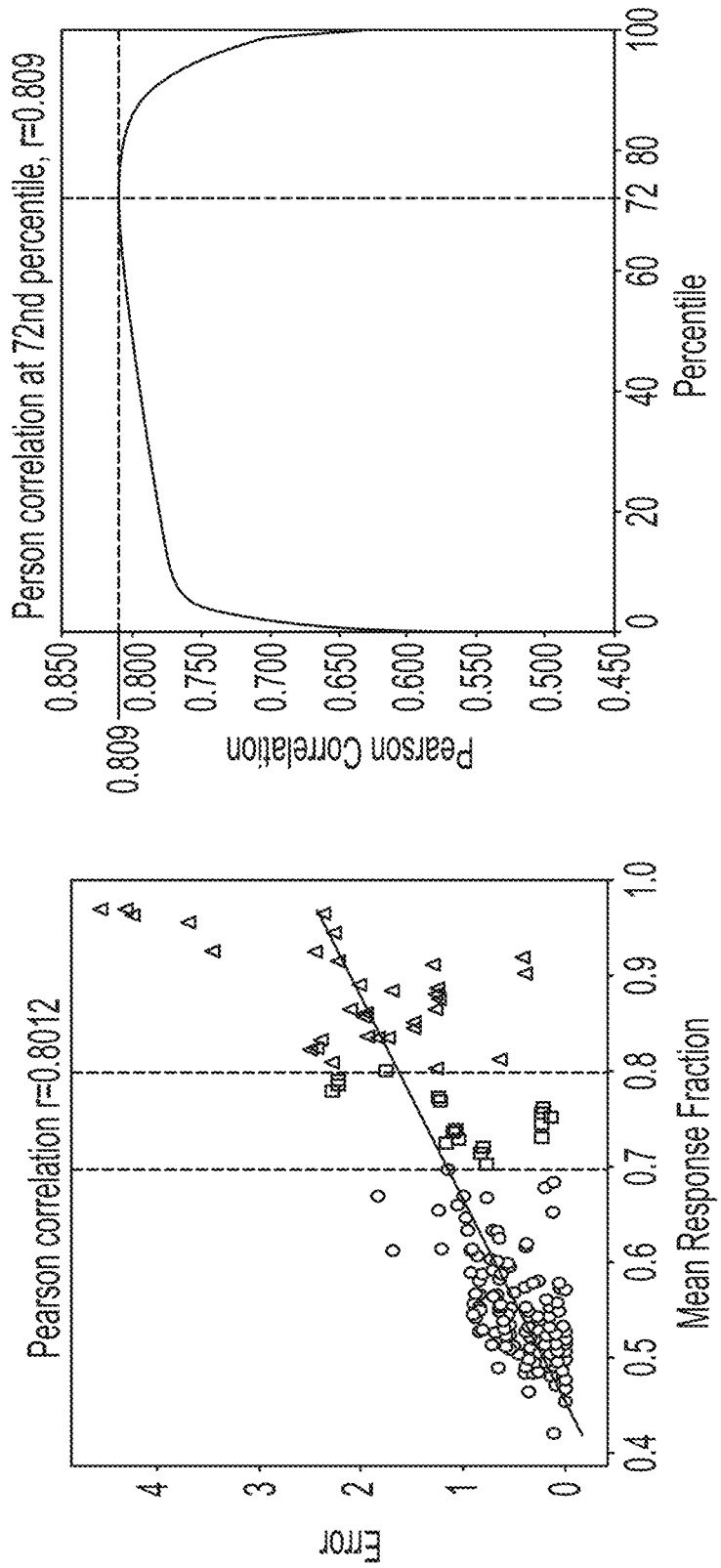
FIGS. 10, 11, and 12 depict example results comparing the present system to past objective image testing systems.
Figure 11:
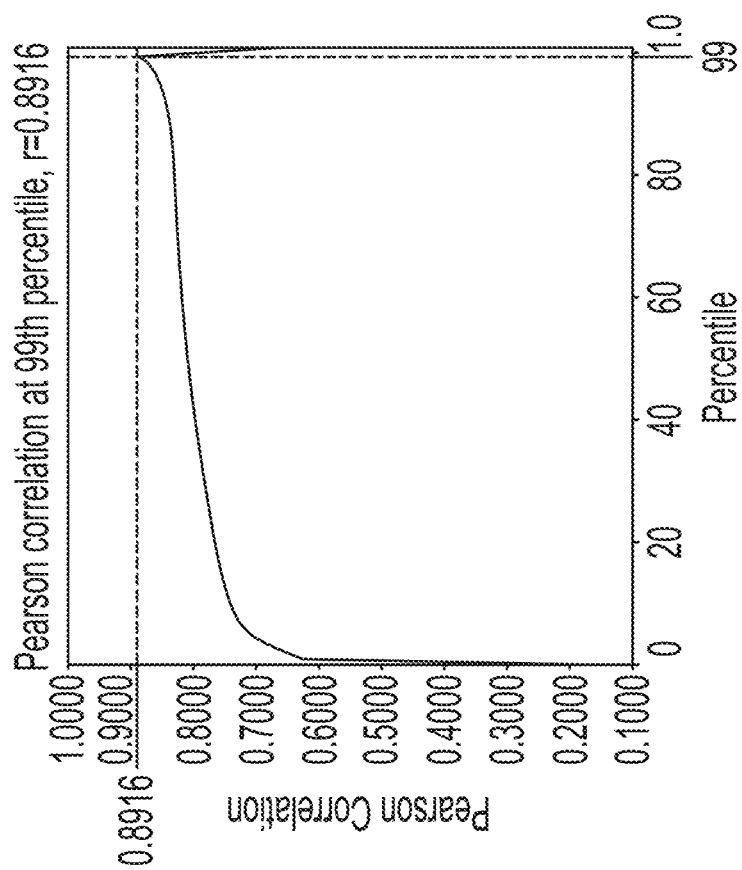
Figure 11:
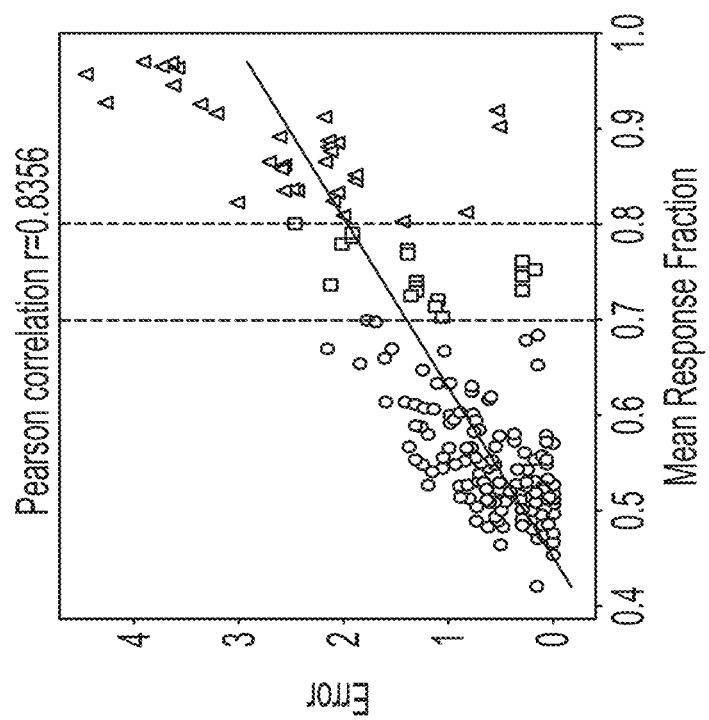
Figure 12:
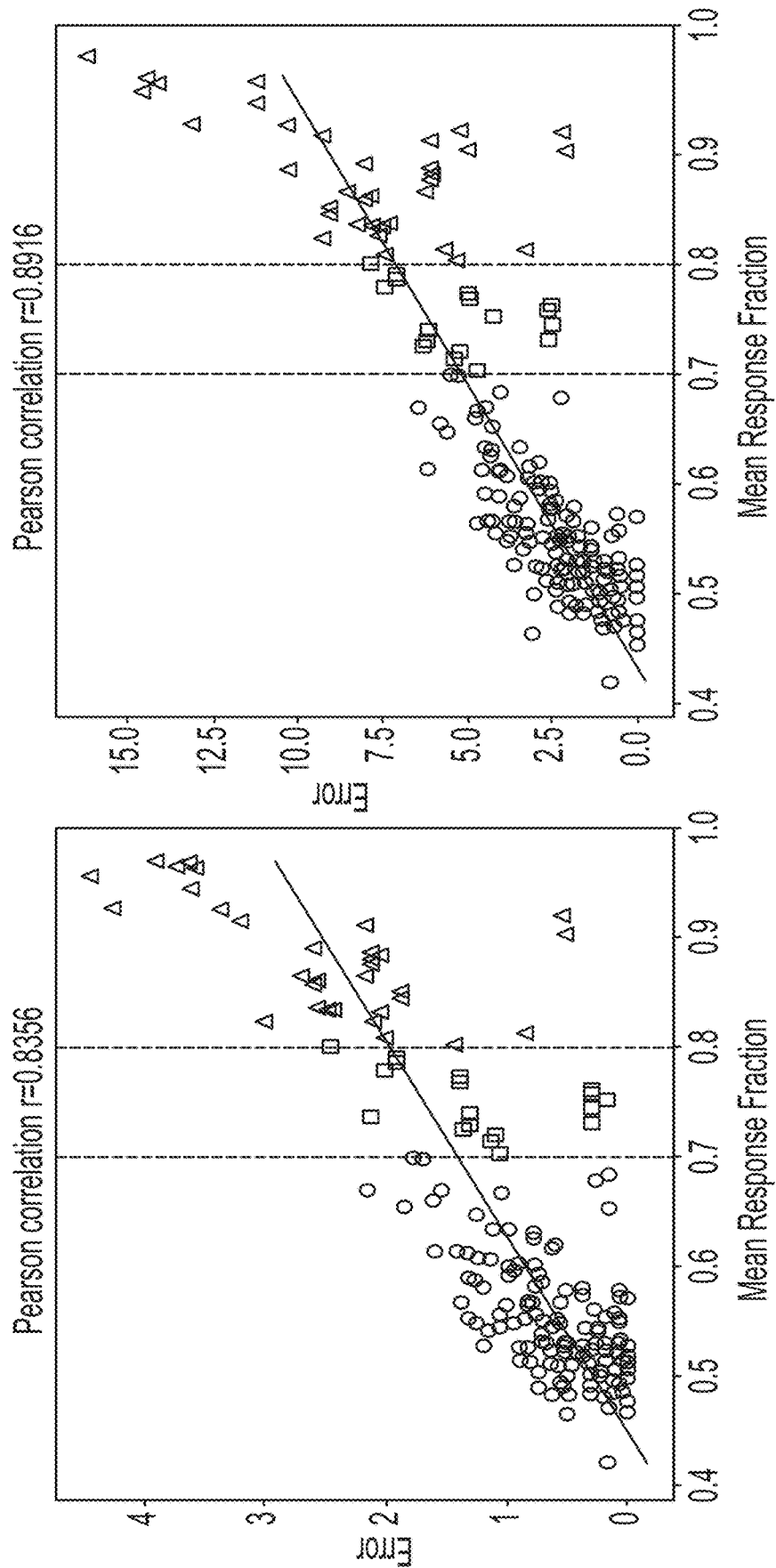

FIGS. 10, 11, and 12 depict example results comparing the present system to past objective image testing systems.

Referring to FIGS. 10, 11, and 12, in various embodiments, the present system provides significantly better detection as well as a better false alarm rate when compared to previous objective tests. For example, FIG. 10 depicts example results using a prior objective system (S-CIELAB). On the left is an error map comparing the mean delta E as a function of the mean response fraction. On the right is a graph of the Pearson correlation between the p-th percentile rank pooling of the error map. Using average pooling, the prior art objective system results in a correlation of 0.8012 when compared to subjective results for an entire dataset. Using percentile rank pooling the correlation is slightly higher at 0.809 at the maximum for the 72nd percentile. FIG. 11 depicts example results using various embodiments of the present disclosure. On the left is an error map comparing the mean delta E as a function of the mean response fraction. On the right is a graph of the Pearson correlation between the p-th percentile rank pooling of the error map. Using average pooling, the prior art objective system results in a correlation of 0.8356 when compared to subjective results for an entire dataset. Using percentile rank pooling the correlation is higher still at 0.8916 at the maximum for the 99th percentile. FIG. 12 depicts a graphical comparison of the mean delta E and percentile rank methods using the correlation of embodiments of the present disclosure. In this example, the correlation using mean delta E is 0.8356 (as shown by the left chart) while the correlation using percentile rank increases to 0.8916 (as shown by the right chart). As shown in FIG. 12, the outliers of the right chart are much closer to the estimated correlation line, thereby showing the improvement provided by the percentile rank pooling method.

In the preceding description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A method for comparing images for image testing comprising:
    applying at least one display property to a test image to generate a display modified test image;
    applying the at least one display property to a reference image to generate a display modified reference image;
    converting the display modified test image from a spectral domain to 3-color space;
    converting the display modified reference image from the spectral domain to 3-color space;

applying a cone absorption mosaic to the display modified test image for a plurality of eye positions to generate a plurality of cone absorption test images;

applying a cone absorption mosaic to the display modified reference image for the plurality of eye positions to generate a plurality of cone absorption reference images;

generating an eye modified test image based on the plurality of cone absorption test images;

generating an eye modified reference image based on the plurality of cone absorption reference images; and comparing the eye modified test image with the eye modified reference image to determine human perceivable differences between the test image and the reference image.

2. The method of claim 1, wherein:

generating the eye modified test image includes averaging the plurality of cone absorption test images to generate the eye modified test image; and generating the eye modified reference image includes averaging the plurality of cone absorption reference images to generate the eye modified reference image.

3. The method of claim 1, wherein the cone absorption mosaic is configured to simulate positioning of a cone in a human eye retina, wherein the cone is associated with a particular spectrum of light.

4. The method of claim 1, wherein the at least one display property comprises at least one of a subpixel layout or a spectral emission.

5. The method of claim 1, wherein applying the at least one display property to the test image to generate the display modified test image comprises:

generating a subpixel matrix for a display based on a subpixel layout;

applying the subpixel matrix to the test image;

converting the test image to a spectral domain from 3-color space; and applying a spectral emission to the test image to generate the display modified test image.

6. The method of claim 5 further comprising:

applying an optical transfer function to the display modified test image; and applying the optical transfer function to the display modified reference image.

7. The method of claim 6, wherein applying the at least one display property to the reference image to generate the display modified reference image comprises:

applying the subpixel matrix to the reference image;

converting the reference image to the spectral domain from 3-color space; and applying the spectral emission to the reference image to generate the display modified test image.

8. The method of claim 1, wherein comparing the eye modified test image with the eye modified reference image comprises:

transforming the eye modified reference image and eye modified test image into CIELAB color space;

calculating a Euclidean distance between each pixel in the eye modified reference image and the corresponding pixel in the eye modified reference image; and applying a pooling function to the Euclidean distance.

9. The method of claim 8, wherein the pooling function comprises at least one of applying a mean based on the Euclidean distance or selecting a value according to a percentile rank.

10. The method of claim 1, wherein the test image comprises an image resulting from a lossy compression algorithm being applied to the reference image.

11. A system for comparing images for image testing comprising:

a processor; and a memory, wherein the memory stores instructions that, when executed by the processor, cause the processor to:

apply at least one display property to a test image to generate a display modified test image;

apply the at least one display property to a reference image to generate a display modified reference image;

convert the display modified test image from a spectral domain to 3-color space;

convert the display modified reference image from the spectral domain to 3-color space;

apply a cone absorption mosaic to the display modified test image for a plurality of eye positions to generate a plurality of cone absorption test images;

apply a cone absorption mosaic to the display modified reference image for the plurality of eye positions to generate a plurality of cone absorption reference images;

generate an eye modified test image based on the plurality of cone absorption test images;

generate an eye modified reference image based on the plurality of cone absorption reference images; and compare the eye modified test image with the eye modified reference image to determine human perceivable differences between the test image and the reference image.

12. The system of claim 11, wherein the instructions that further cause the processor to generate the eye modified test image include instructions that cause the processor to average the plurality of cone absorption test images to generate the eye modified test image, and wherein the instructions that further cause the processor to generate the eye modified reference image include instructions that cause the processor to average the plurality of cone absorption reference images to generate the eye modified reference image.

13. The system of claim 11, wherein the cone absorption mosaic is configured to simulate positioning of a cone in a human eye retina, wherein the cone is associated with a particular spectrum of light.

14. The system of claim 11, wherein the at least one display property comprises at least one of a subpixel layout or a spectral emission.

15. The system of claim 11, wherein the instructions that cause the processor to apply the at least one display property to the test image to generate the display modified test image include instructions that cause the processor to:

generate a subpixel matrix for a display based on a subpixel layout;

apply the subpixel matrix to the test image;

convert the test image to a spectral domain from 3-color space; and apply a spectral emission to the test image to generate the display modified test image.

16. The system of claim 15, wherein the instructions further cause the processor to:

apply an optical transfer function to the display modified test image; and apply the optical transfer function to the display modified reference image.

17. The system of claim 16, wherein the instructions that cause the processor to apply the at least one display property to the reference image to generate the display modified reference image include instructions that cause the processor to:
- apply the subpixel matrix to the reference image;
- convert the reference image to the spectral domain from 3-color space; and
- apply the spectral emission to the reference image to generate the display modified test image.

18. The system of claim 11, wherein the instructions that cause the processor to compare the eye modified test image with the eye modified reference image include instructions that cause the processor to:
- transform the eye modified reference image and eye modified test image into CIELAB color space;
- calculate a Euclidean distance between each pixel in the eye modified reference image and the corresponding pixel in the eye modified reference image; and
- apply a pooling function to the Euclidean distance.

19. The system of claim 18, wherein the pooling function comprises at least one of applying a mean based on the Euclidean distance or selecting a value according to a percentile rank.

20. The system of claim 11, wherein the test image comprises an image resulting from a lossy compression algorithm being applied to the reference image.

* * * * *